Nov. 21, 1967   H. G. NADEAU ET AL   3,353,411
APPARATUS FOR SAMPLING GAS FROM PLASTIC FOAM
Filed Feb. 7, 1966   2 Sheets-Sheet 2

HERBERT G. NADEAU
PAUL H. WASZECIAK
INVENTORS.

BY Dennis A Lith
AGENT

United States Patent Office 3,353,411
Patented Nov. 21, 1967

3,353,411
APPARATUS FOR SAMPLING GAS
FROM PLASTIC FOAM
Herbert G. Nadeau, North Haven, and Paul H.
Waszeciak, Hamden, Conn., assignors to The
Upjohn Company, Kalamazoo, Mich., a corporation of Delaware
Filed Feb. 7, 1966, Ser. No. 525,619
10 Claims. (Cl. 73—421.5)

This invention relates to a novel fluid sampling device and is more particularly concerned with a device for obtaining fluid samples substantially free from atmospheric contamination from puncturable containers of said fluid. In a particular embodiment the invention relates to a method and apparatus for obtaining samples of the gas enclosed in the cells of a cellular plastic such as rigid polyurethane foam.

With the development of sophisticated methods and apparatus for analysing fluids, both liquid and gaseous, using samples of the order of 1 cc. or less in volume there has come the need to devise simple elegant methods of obtaining analytical samples of said fluids accurately and free from contamination by undetermined environmental fluids.

It is an object of the present invention to provide means for sampling fluids in this manner, said means being characterised by simplicity, ease of operation and ready adaptability to the sampling of fluids, both liquid and gaseous, under a variety of conditions and from a wide range of containers. In particular it is an object of the present invention to provide a method of determining the constituents of the gas entrapped in the cells of plastic foams, particularly polyurethane foams. Such determinations provide important information relating to the properties, e.g. thermal insulating capacity, of said foams as will be discussed in detail hereinafter. Other objects of the invention and other particular applications of the present invention will become apparent to one skilled in the art from the discussion which follows.

The invention consists in a sampling device for obtaining a fluid sample from a puncturable container of said fluid which device comprises in combination:

(a) A hollow member adapted to receive a puncturable container of the fluid to be sampled;

(b) A first and a second port in the walls of said hollow member and so disposed therein that said puncturable container is positioned between said first and second port;

(c) Self-sealing puncturable closures sealing each of said first and second ports;

(d) Means for removing and replacing the gas in said hollow member;

(e) Means for connecting said hollow member to the sample receiving chamber of a fluid analyser via said sealed first port;

(f) An elongated hollow needle adapted to pass from the outside of said hollow member sequentially through (i) the self-sealing puncturable closure of said second port, (ii) the walls of said puncturable container of fluid to be sampled, and (iii) the self-sealing puncturable closure of said first port into the sample receiving chamber of said fluid analyser; and (g) Means for drawing the fluid sample into said elongated hollow needle and for expelling said sample from said elongated hollow needle into the receiving chamber of said fluid analyser.

The fluid analysers, in conjunction with which the sampling devices of the invention are used, can be any of the analytical devices which require a sample in fluid (i.e. gaseous or liquid) form. Illustrative of such devices are gas chromatographs, mass spectrometers, nuclear magnetic resonance spectrometers, infrared spectrometers, ultraviolet spectrometers, and the like.

The sampling devices of the invention can take a variety of forms, as will be discusesd below, depending upon the nature of the container enclosing the fluid to be sampled. Thus, in one form of the sampling device of the invention the fluid to be sampled is the gas enclosed in the cells of a plastic foam such as polyurethane foam. In this case the sample container is a multicompartmented container formed by the matrix of the foam and is generally obtained by removal of a representative sample from a piece of foam, for example, by cutting a cylindrical of like shaped sample using a suitable instrument such as a laboratory cork borer of appropriate internal diameter.

When the sample device is to be used in this way, i.e., for sampling gas from plastic foam, the hollow member of the device into which the sample is placed advantageously is a hollow cylinder in order to impart maximum strength to the walls thereof and thereby resist deformation when said hollow member is evacuated as described below. However, the precise shape of the hollow member is not critical and it can be of other polyhedral configurations for example, it can be cuboidal, rhomboidal, octahedral, dodecahedral and the like; indeed, the internal and external configurations need not be alike.

Said hollow member can be fabricated from a variety of materials including metal such as brass, steel, aluminum and the like or any durable plastic such as Teflon, polyethylene and the like. Said hollow member is constructed so that it can be opened to receive the fluid container and reclosed in a convenient manner after insertion of said container. The most convenient method of accomplishing this opening and closing varies according to the configuration of the hollow member. For example, where said hollow member is cylindrical, one of the planar end pieces of the hollow member can be made detachable as by cutting thread on the inside or outside wall at one end of the barrel of said cylinder and constructing the end of the said cylinder in the form of a cap with corresponding threads adapted to engage the threads on said barrel. A suitable gasket fabricated from rubber, elastomeric polyurethane, and the like is employed to seal the joint between the cap and the cylinder barrel.

Alternatively the hollow member can be constructed in the form of two hollow cylinders each of which is closed at one end and open at the other. The open ends are adapted, advantageously with the aid of appropriate flanges and a suitable gasket of rubber, elastomeric polyurethane, and the like, to form a butt joint. The joint can be held in place using an appropriate clamp or clamps.

Said hollow member is provided with a first and a second port each of which can be of any desired size and shape provided they are each capable of allowing an elongated hollow needle to pass therethrough. Said ports are generally mounted in such relationship that the fluid container to be sampled can be placed between them in said hollow member. For example, where said hollow member is cylindrical the first port is advantageously placed in one end wall of said cylinder and the second port is placed in the opposite end wall of said cylinder, said ports preferably being disposed symmetrically with respect to the axis of the cylinder.

Each of said ports is adapted to be sealed by a self-sealing puncturable closure. The latter generally takes the form of a disc, or the like shape, of a self-sealing puncturable material such as natural and synthetic rubber and the like. Silicone rubber is the preferred material from which said closures are fabricated. Advantageously said closures are mounted in said ports by providing appropriate flanges on the latter against which said closures are held by appropriate clamping means, for example, by appropriately threaded male or female members which engage the corresponding threads cut into the inner or outer walls of said ports.

One of said ports in the hollow member is additionally adapted to be connected in a suitable manner to the sample receiving chamber of a fluid analyser. This can be accomplished for example, by means of an appropriate coupling such as an extension with threads cut on the outside thereof to act as male member and to engage the threads of a corresponding female member on the entrance to the sample receiving chamber of a fluid analyser. When the sampling device is coupled to the fluid analyser the sample receiving chamber of the latter is separated from the inside of the hollow member of the former only by the self-sealing puncturable closure in the port of the sampling device.

The hollow member of the sampling device of the invention is additionally provided with valve means at a suitable point or points in the wall thereof whereby the atmosphere in said hollow member can be removed by evacuation and replaced by any other desired gas. If desired two or more appropriate valves can be provided to accomplish this purpose.

In sampling fluid by means of the sampling device of the invention the container of fluid to be sampled is placed in the hollow member. The latter can be provided with suitable means such as cradling devices, retaining springs, and the like designed to maintain the container in desired relationship to the ports of said hollow member. The hollow member is then closed.

When this operation is complete a hollow needle, open at one end and closed at the other by attachment to pump means such as a syringe, collapsible rubber bag and the like, is inserted through the self-sealing closure of that port (called hereinafter the "second port" for identification) in the hollow member which is not coupled to the fluid analyser. At this juncture the tip of the needle is passed sufficiently far through the closure of said second part to bring the inner space in said needle in direct communication with the internal atmosphere of the hollow member but not sufficiently far to allow the needle to enter the container of fluid to be sampled.

The atmosphere in the hollow needle and hollow member is then replaced by that of a suitable inert gas such as helium, argon, neon, krypton, and the like. Said gas is preferably so chosen that it is inert i.e. does not interfere in any way with the analytical procedure to be carried out. For example, when a spectrophotometric analysis is to be carried out, the inert gas employed in the sampling device is so chosen that it does not exhibit any significant absorption of energy in the regions of the spectrum in which there occurs the characteristic absorption of the material being analyzed.

By a sequence of one or more evacuation and flushing steps the atmosphere in the hollow member and in the hollow needle is replaced by the chosen inert gas.

The needle is then passed sequentially through the fluid container to be sampled thence through the self-sealing puncturable closure in the port of said hollow member coupled to the fluid analyser (hereinafter called the "first port" for identification) so that the needle tip finally projects into the sample receiving chamber of said fluid analyser. When the open end of the hollow needle is passing through the fluid containing compartment or compartments of the container to be sampled, said fluid is drawn into the hollow needle by appropriate manipulation of the pump means. When the open end of the needle finally projects into the sample receiving chamber of the fluid analyser, the sample of fluid contained within the needle is expelled therefrom into said chamber of the fluid analyser by operation of the pump means attached to the other end of said needle. The analysis of the sample so transmitted from the fluid container to the sample receiving chamber of the fluid analyser is then carried out in conventional manner.

The dimensions of the hollow needle employed in the sampling device of the invention can vary depending upon the dimensions of the puncturable container of fluid to be sampled. Thus, in the sampling of a plastic foam the external diameter of the needle is preferably less than the average diameter of the cells in the foam. Where the sample container is of larger dimensions the dimension of the external diameter of the needle is less critical. In general the external diameter of the needle is advantageously within the range of about 1 mm. to about 0.5 mm. and the internal diameter of the needle is within the range of about 0.75 mm. to about 0.25 mm. although these latter dimensions are not critical.

The device of the invention will now be described further in terms of an illustrative specific embodiment thereof adapted for use in the sampling of gas contained in the closed cells of a plastic foam. Analysis of said gas yields important information concerning the thermal insulating capacity of the foam, there being a definite and direct relationship between the composition of the cellular gas and the thermal insulating capacity.

Figure 1:
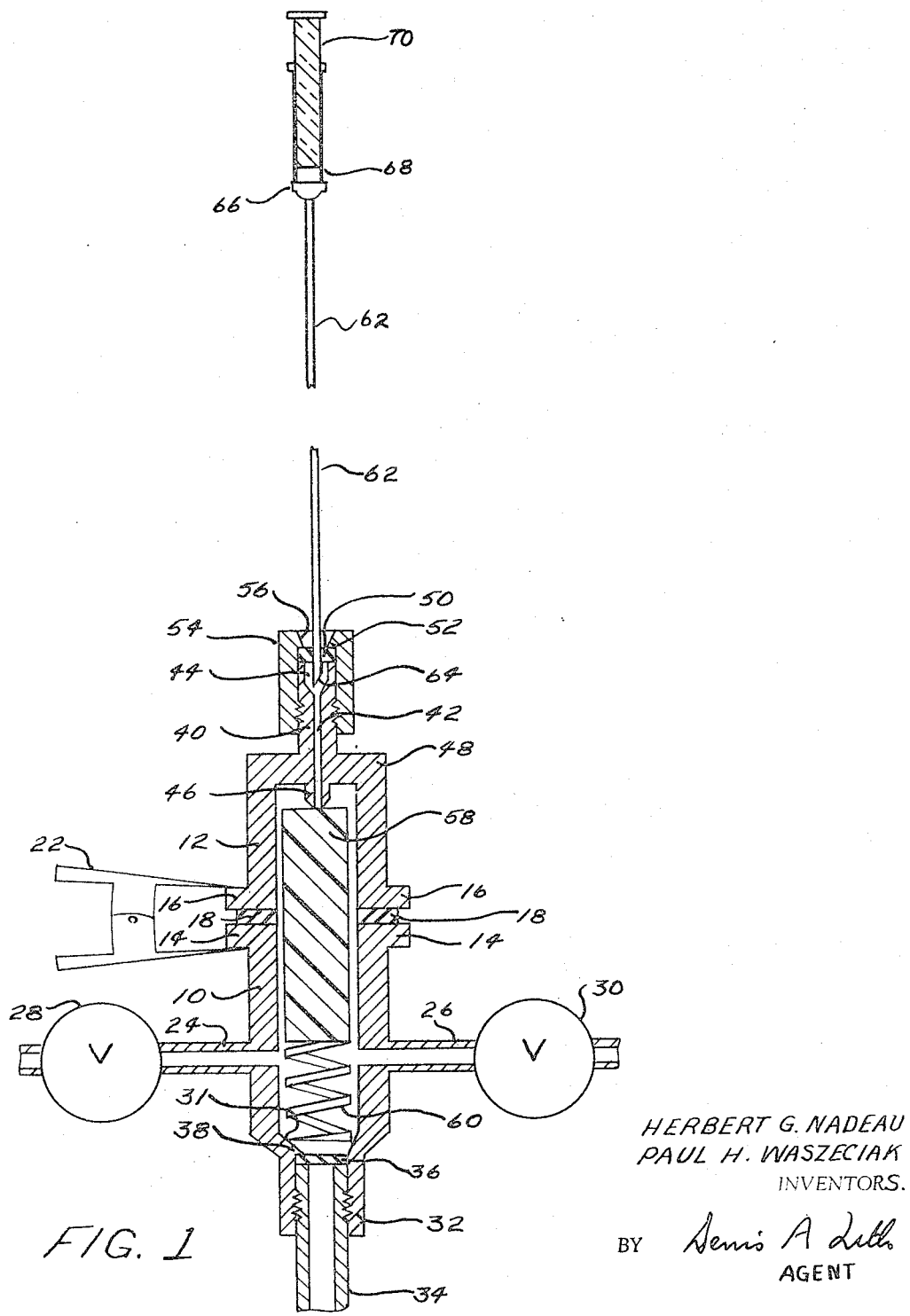
FIGURE 1 is a cross-sectional view of a sampling device according to the invention showing an embodiment thereof adapted for the sampling of gas from the closed cells of a section of plastic foam.

Referring first to FIGURE 1 of the drawings there is shown an embodiment of the invention in which the hollow sample-receiving chamber member is formed of two hollow cylindrical sections 10 and 12. Said sections 10 and 12 are each provided with flanges 14 and 16, respectively, which taken together with the gasket 18 serve to close and seal the said hollow member. The hollow member sections 10 and 12 can be fabricated from any suitable material such as brass, stainless steel, or any durable plastic such as Teflon, polyethylene, and the like. The gasket 18 can be fabricated from any suitable resilient material such as natural and synthetic rubber elastomeric polyurethane, and the like, and can be fabricated in a variety of shapes. For example, said gasket can be provided in the form of an O-ring having a circular cross section and corresponding indentations can be provided in the abutting faces of said flanges 14 and 16 to receive and retain said gasket 18. The sections 10 and 12 are held in securely sealed relationship with the gasket 18 by suitable clamping means such as the C-clamp 22 or a combination of two or more such clamps.

The section 10 is provided with exit tubes 24 and 25 which are controlled by valves 28 and 30. The hollow member section 10 is also provided with a tapered end 31 housing an exit port 32 which is of narrower cross-sectional diameter than the main sample receiving chamber formed by sections 10 and 12. Said exit port 32 is provided on its inner surface with threads which engage corresponding threads on the tube 34 which latter leads directly into the sample receiving chamber of a fluid analyzer such as a gas chromatograph, mass spectrometer, nuclear magnetic resonance spectrometer, and the like. A self-sealing puncturable closure 36 separates the chamber formed by sections 10 and 12 of the sampling device of the invention from the interior of the tube 34 leading to the sample receiving chamber of the fluid analyser. Said closure 36 is preferably fabricated from self-sealing rubbers such as silicone rubber; other self-sealing puncturable materials known in the art can be used. Said closure 36 is held in sealing engagement against a flange 38 by the butt of the tube 34.

The hollow member section 12 is provided with an entry 40 having a channel 42 passing from a tubular tapered entrance 44 on the exterior of said hollow member, through the wall of said hollow member and communicating with the interior of the chamber in said hollow member via a projection 46 which is disposed substantially centrally in the end wall 48 of section 12. The channel 42 which, together with the entrance 44 thereto serves as guide means for the needle member employed in the device of the invention, is preferably substantially circular in cross section and its main axis is disposed substantially concentrically with respect to (a) that of the chamber formed by the interior of sections 10 and 12 and (b) that of the tube 34 leading to the sample receiving chamber of the fluid analyzer.

The entrance 44 to the entry port 40 is sealed by means of a self-sealing puncturable closure 50 which is fabricated from the same or like materials as that used for the corresponding closure 36 in the exit port 32. Said closure 50 is held in place against the butt of entry port 40 by means of a flange 52 cut on the cap 54. The cap 54 is provided with an opening 56 in the end thereof whereby the central portion of the exterior side of said closure 50 is exposed. The cap 54 is fitted to the outside of said entry port 40 by means of appropriate threads cut in the outside wall of said entry port 40 and in the interior wall of said cap 54.

The sample of plastic foam 58 from the cells of which gas is to be sampled is supported within the chamber of the hollow member formed by sections 10 and 12 and held with one end thereof in contact with the projection 46 by the action of the coiled spring 60 located in the barrel of section 10. The dimensions of said sample 58 and of the interior of said hollow member formed by sections 10 and 12 and all the attachments thereto can be varied over a wide range to suit the convenience of the operator and the sample size requirements of the anlytical device which is employed. In general, for the sampling of gas from a plastic foam for subsequent analysis in a gas chromatograph it is preferable to use a cylindrical sample of foam measuring from about 0.5 to 1 inch in diameter and from about 2 to about 4 inches in length. The dimensions of the interior of the hollow member are proportioned to accommodate such a sample. The dimensions of the channel 42 are governed by the exterior dimensions of the needle member to be used in the analysis. Preferably the cross section diameter of the channel 42 is of the order of about 1.5 mm. to about 1.0 mm.

In carrying out the sampling of gas from the closed cells of a specimen of plastic foam using the device shown in FIGURE 1, the foam specimen is placed in the chamber of the hollow member by removing the clamp 22, taking off the section 12 with attachments, inserting the specimen, replacing section 12 with accompanying gasket 18 in sealing relationship with section 10 via the flanges 14 and 16, and replacing the clamp 22. With the plastic foam in place in the hollow member the next step in thhe sampling requires the use of an elongated hollow needle 62 having a sharpened tip 64 at one end and a shank 66 at the other by means of which the needle 62 is attached to the barrel 68 of a syringe fitted with a slidable plunger 70, the joint between thhe inside wall of said barrel 68 and the surface of said slidable plunger 70 being leakproof under vacuum. Said needle 62 is of a length measured from the tip 64 thereof to the shank 66 thereof which is equal to or greater than the distance from the entrance 56 of the cap 54 on the entry port 40 to a point in the exit port 32 on that side of the closure 38 which is remote from the inside of the hollow member of the sampling device.

The tip 64 of the hollow needle 62 is inserted through the closure 50 in the entry port 40, until direct communication is established between the interior of said needle and the interior of the hollow member formed by sections 10 and 12. The depth to which the needle tip 64 is inserted beyond the inner surface of the closure 50 is not critical provided the tip 64 does not penetrate the foam sample 58 at this juncture. The depth of penetration of the needle tip 64 shown in FIGURE 1 is for purposes of illustration only and is not to be regarded as limiting. It should be noted also that the relative position of the needle 62 with attached barrel 68 and plunger 70 shown in FIGURE 1 is only one of the various positions into which this needle assembly is placed during the sampling operations, all of which positions will be described hereinafter. For the sake of brevity and avoidance of needless repetition, these various positions will not be specifically illustrated in separate drawings.

With the needle tip 64 inserted through the closure 50 as illustrated in FIGURE 1 the atmosphere within the hollow member and within the needle is then removed and replaced by a suitable inert gas such as helium, argon, krypton, and the like. This is accomplished by evacuation of the hollow member through operation of one of the valves 28 and 30 followed by introduction of inert gas through the other of said valves. Repetition of this operation through several cycles ensures that all the original gas in said hollow member and needle is replaced by the desired inert gas. Appropriate use of the plunger 70 to flush gas into and out of the hollow needle 62 during the evacuation and flushing operations assists in ensuring that the atmosphere in said needle is completely replaced by inert gas.

When the flushing operation is complete the needle tip 64 is passed via the guide channel 42 through the foam sample 58, through the hollow centre of the coiled spring 60, and finally through the puncturable closure 36 so that the contents of the needle are placed in direct contact with the interior of the sample receiving chamber of the fluid analyser via the tube 34. The tapered wall 31 of the hollow member serves to guide the needle tip 64 and bring said tip into contact with that surface of the closure 36 which is exposed to the interior of said hollow member.

Advantageously, while the needle tip 64 is passing through the cells of the plastic foam sample 58 the plunger 70 is operated in such a manner as to draw fluid sample from said cells into the interior of the hollow needle 62. When the needle tip 64 finally passes through the closure 36 and enters the sample receiving chamber of the fluid analyser the fluid sample is expelled from the hollow needle 62 into said sample receiving chamber by depression of the plunger 70 within the barrel 68.

The cross sectional dimensions of the hollow needle 62 are preferably so chosen that the outside diameter of said needle is less than the average diameter of the cells in the plastic foam sample. It has been found that needles having an outside diameter of about 1 mm. to about 0.5 mm. are suitable for sampling of a wide variety of plastic foams but needles having dimensions greater or smaller than this can be used if desired.

As will be appreciated by one skilled in the art the details of construction of the specific embodiment shown in FIGURE 1 can be modified without changing the essential mode of operation of the fluid sampling device of the invention.

Figure 2:
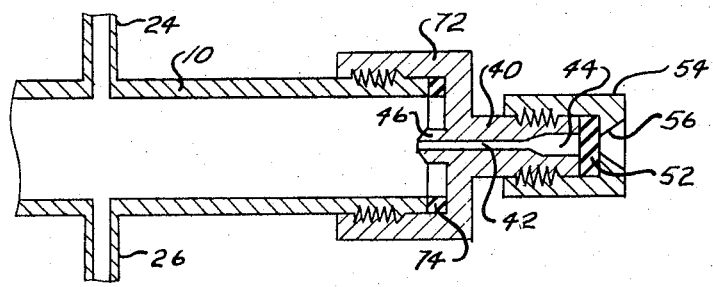
FIGURE 2 is a partial cross-sectional view of a modification of the device of FIGURE 1 showing an alternative method of providing means for closing the hollow sample receiving member thereof.

In FIGURE 2 there is shown an alternative manner of providing means of opening and closing the hollow member of the sampling device in order to be able to insert the foam sample or other fluid container into said hollow member. In the alternative construction shown in FIGURE 2 the section 10 of the hollow member is not provided with the flanges 14 shown in FIGURE 1 but is threaded on the exterior of its open end so as to receive a cylindrical cap member 72 having corresponding threads cut on the inside thereof. Said cap member 72 serves as housing for the entry port 40 which is constructed, as described in relation to FIGURE 1, with channel 42 connecting the entrance 44 to the interior of the hollow member via projection 46. Said entry port 404 is also sealed with puncturable closure 52 held in place by the cap 54 as described in connection with the corresponding features of FIGURE 1.

A gasket 74 serves to seal the joint between the butt of section 10 and the cap 72. Said gasket can be fabricated from any suitable material such as natural and synthetic rubber, elastomeric polyurethane, and the like.

Figure 3:
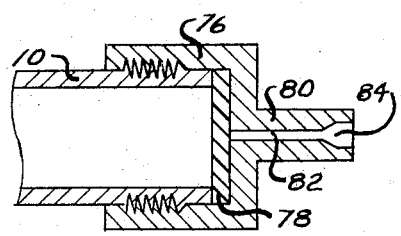
FIGURE 3 is a partial cross-sectional view of a modification of the device of FIGURE 1 showing yet another alternative method of providing means for closing the hollow sample receiving member thereof.

In FIGURE 3 there is shown a further alternative method of providing means for opening and closing the hollow member of the device of the invention to enable the insertion therein of the container of fluid to be sampled. The device shown partially in FIGURE 3 is a modification of that shown in FIGURE 2 in which the hollow member section 10 is provided at its open end with a cap 76 which serves to house the entry port 80 having a channel 82 and a tapered entrance 84. In the modification in FIGURE 3 the rupturable closure 78 is placed on the inner end of said channel 82 i.e. the point at which said channel emerges from the entry port into the interior of the hollow member formed by section 10. Said closure 78 also serves to seal the joint between the cap 76 and the butt of section 10.

Other alternative means of closing the hollow member of the sampling device of the invention will be apparent to those skilled in the art and those shown specifically in FIGURES 1, 2 and 3 are intended to be illustrative only.

Figure 4:
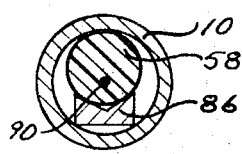
FIGURE 4 is a cross-sectional view taken in a plane vertical to the axis of the hollow member of the embodiment of FIGURE 1 and showing a method of supporting the plastic foam sample therein eccentrically with respect to the axis of said hollow member.

In FIGURE 4 there is shown a means of supporting a plastic foam sample in the hollow member of the sampling device of the invention in such a position that multiple sampling can be made from a single piece of foam. In the cross-sectional view shown in FIGURE 4 the foam sample 58 is shown supported in a cradle member 86 within the barrel of the hollow member section 10. In this manner the axis of the foam sample 58 is no longer concentric with the axis of the hollow member. With the entry port channel 42 mounted concentrically with respect to the axis of the hollow member in the device of FIGURE 1, but the foam sample 58 mounted in said hollow member as shown in cross-section in FIGURE 4, the needle member 62 will penetrate said foam sample 58 along a line represented in cross-section by point 90 in FIGURE 4. In order to take one or more fluid samples from the same plastic foam sample it is merely necessary to rotate said foam sample about its axis through an appropriate distance and repeat the sampling procedure.

While the specific embodiment shown in FIGURE 1 and the modifications thereof shown in FIGURES 2–4 have been described in relation to their use in the sampling of gas enclosed in polyurethane foam, it is to be understood, as will be obvious to one skilled in the art, that said embodiments can also be used in the sampling of fluids, including both liquids and gases, from other types of containers. For example, fluid samples contained in puncturable containers such as flexible bags, polyethylene bags, metal or plastic cylinders with puncturable rubber, polyethylene and like closures at each end, and the like can be employed. The fluid to be sampled in this manner can be, for example, the volatile phase existing in equilibrium with a solid or liquid in a sealed container. Thus, for example, the device of the invention can be used to sample odors associated with packaged materials such as coffee, essential oils, perfume and the like. In a further illustration of the use of the sampling device of the invention the fluid permeability of membranes can be determined readily by placing in the hollow member of the device a container of fluid which container is sealed by the membrane whose permeability is to be determined. The amount of fluid which has passed through the membrane into the interior of the hollow member at any given time can be determined by sampling the atmosphere in said hollow member; in this aspect the hollow member itself forms the container for the fluid to be sampled. Other convenient methods of employing the sampling device of the invention to determine permeability of membranes can be adopted. For example, a hollow cylindrical extension can be fitted between the sections 10 and 12 of the hollow member shown in FIGURE 1 said cylindrical extension having a side arm in which a fluid can be confined and be separated from the main arm of the extension by the membrane whose permeability is to be studied. The amount of fluid which has passed through the membrane at any given time is determined by sampling the atmosphere in the hollow member and extension.

Where the fluid to be sampled is available in sufficient quantity the use of a separate container can be eliminated and the hollow member of the sampling device can itself be used as container of the fluid to be sampled. In this embodiment the fluid to be sampled is placed in the hollow member e.g. that formed by the sections 10 and 12 in FIGURE 1, by means of the valves 28 and/or 30. In such an embodiment the sampling device of the invention can be used, for example, for control purposes in reactions involving two or more fluids as reactants. Thus the device could be inserted, via valves 28 and 30, in the feed line of mixed gases being passed as feed to a catalytic converter or like reactor and the composition of the feedstock can be sampled intermittently as required.

In a further specific embodiment of the sampling device the hollow member can be modified to hold two different fluid samples. Using such a modification it is possible to employ the sampling device to follow rates of reaction of two fluids particularly of gaseous fluids. Thus by sampling one fluid from a first fluid sample in the hollow needle 62, sampling from a second sample into the same needle, and allowing the two samples to react in the needle for a measured time interval before expelling the total sample into the receiving chamber of the fluid analyser, it is possible to follow readily the progress of reaction between the two fluids.

Figure 5:
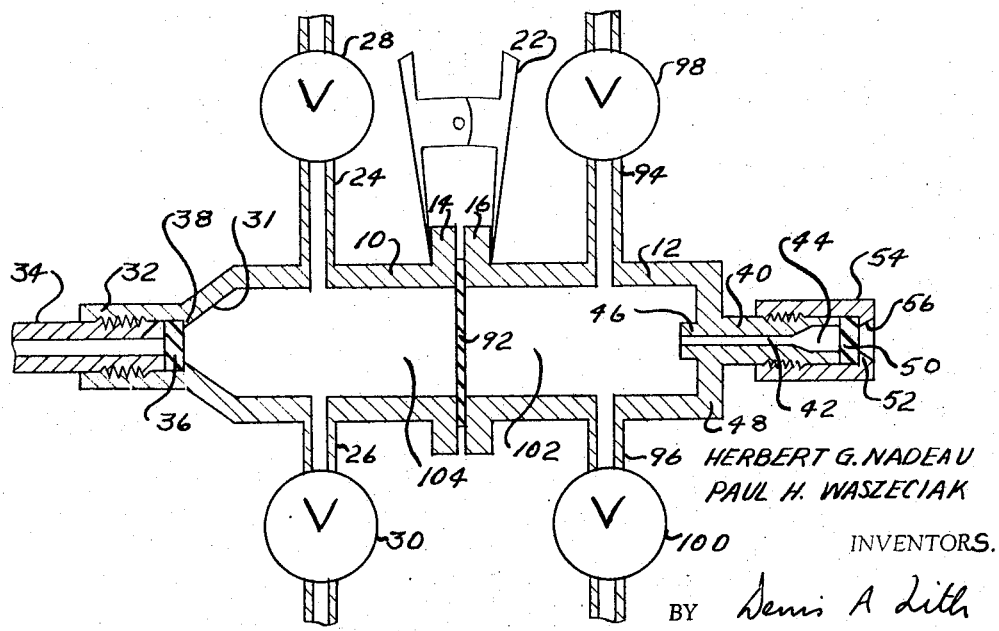
FIGURE 5 is a cross-sectional view of a sampling device according to the invention showing an embodiment thereof for sampling two different fluids.

FIGURE 5 shows a suitable method of modifying the hollow member of the device of FIGURE 1 in order to accomplish the sampling of two different fluids in the above manner. In the device illustrated in FIGURE 5 the mode of construction of hollow member sections 10 and 12 and the various appendages thereto is the same as shown for the corresponding components of the device FIGURE 1 with the exception that section 12 is additionally provided with exit tubes 94 and 96 which are controlled by valves 98 and 100, respectively.

The hollow member section 10 of the device of FIGURE 5, like that of FIGURE 1, is provided with exit tubes 24 and 26 controlled by valves 28 and 30, respectively, and a tapered end 31 with an exit port 32 having a self-sealing puncturable closure 36 held in sealing engagement against flange 38 by the butt of tube 34 leading to the sample receiving chamber of a fluid analyser. The hollow member section 12 of FIGURE 5, apart from the aforesaid exit tubes 94 and 96 and valves 98 and 100, is provided with the various appendages of the corresponding section 12 of FIGURE 1, namely, an entry port 40 with channel 42 passing from a tubular tapered entrance 44 on the exterior of the hollow member, through the wall of said hollow member and communicating with the exterior of the chamber in said hollow member via a projection 46 which is disposed substantially centrally in the end wall 48. The entrance 44 to the entry port 40 is sealed by a self-sealing puncturable closure 50 held in place on flange 52 by cap 54.

In the device of FIGURE 5 the hollow member is divided into two compartments by the self-sealing puncturable closure 92 which is fabricated from any of the materials discussed above for fabrication of closures 36 and 50. Said closure 92 is held in place between the flange 14 in section 10 and flange 16 on section 12 and serves to seal the joint between said sections as well as dividing the hollow member of the sampling device into compartments 102 and 104.

In employing the device shown in FIGURE 5 to sample two different fluids in succession one container to be sampled is placed in compartment 102 and the second container to be sampled is placed in compartment 104. Said containers can be in any of the forms discussed and exemplified above. With the containers in place in the compartments 102 and 104 and the device assembled and sealed as shown in FIGURE 5, the tip 64 of the elongated hollow needle 62 (FIGURE 1) is inserted through closure 50 so that the interior of the needle 62 is in direct contact with the interior of compartment 102 but has not ruptured the wall of the container in said compartment. At this point the atmosphere in each of compartments 102 and 104 is evacuated and replaced by inert gas as hereinbefore described and exemplified.

When the flushing with inert gas is complete the tip 64 of the needle 62 is passed through the walls and fluid in the container in compartment 102 a sample of the contents of said container being drawn into the needle 62 by suitable operation of the plunger 70 (FIGURE 1). The needle 62 is then passed through the closure 92 and the wall and contents of the fluid container in compartment 104 a sample of the fluid in the latter container being drawn into the needle 62 and thereby brought into admixture with the sample from the first said container. The mixture of the two fluid samples so drawn into the needle 62 in the above operation can be held in the needle for any desired length of time before passing the needle tip 64 through the closure 36 and into the sample receiving chamber of the fluid analyser.

Where the two fluids to be sampled are available in sufficient quantity it is possible to dispense with the use of containers to house said samples for insertion into the compartments 102 and 104. Thus said fluids can be drawn directly into the compartments 102 and 104 by use of the appropriate valves 28 and/or 30 for compartment 104 and valves 98 and/or 100 for compartment 102.

We claim:
1. In a sampling device for obtaining a fluid sample from a puncturable container of said fluid, the combination of:
  (a) a hollow member adapted to receive a puncturable container of the fluid to be sampled;
  (b) a first and a second port in the walls of said hollow member and so disposed therein that said puncturable container is positioned between said first and second port;
  (c) self-sealing puncturable closures sealing each of said first and second ports;
  (d) means for removing and replacing the gas in said hollow member;
  (e) means for connecting said hollow member to the sample receiving chamber of a fluid analyser via said sealed first port;
  (f) an elongated hollow needle adapted to pass from the outside of said hollow member sequentially through (i) the self-sealing puncturable closure of said second port, (ii) the walls of said puncturable container of fluid to be sampled and (iii) the self-sealing puncturable closure of said first port into the sample receiving chamber of said fluid analyser; and
  (g) means for drawing the fluid sample into said elongated hollow needle and for expelling said fluid sample from said elongated hollow needle into the sample receiving chamber of said fluid analyser.
2. The sampling device of claim 1 wherein said hollow member is provided with a detachable section to permit insertion of the puncturable fluid container into said hollow member.
3. The sampling device of claim 1 wherein said second port is provided with guide means adapted to permit passage of said elongated hollow needle therethrough and to orient said needle on the appropriate path necessary to achieve passage of said needle through the walls of said puncturable container and the self-sealing puncturable closure of said first port into the sample receiving chamber of said fluid analyser.
4. In a sampling device for obtaining a fluid sample from a puncturable container of said fluid, the combination of:
  (a) a hollow member having a substantially cylindrically shaped chamber adapted to receive a puncturable container of the fluid to be sampled;
  (b) a first port housed in one end wall of said hollow member and a second port housed in the other end wall of said hollow member said ports being disposed symmetrically with respect to the axis of said cylindrical chamber;
  (c) self-sealing puncturable closures sealing each of said first and second ports;
  (d) means for removing and replacing the gas in said hollow member;
  (e) means for connecting said hollow member to the sample receiving chamber of a fluid analyser via said sealed first port, the self-sealing puncturable closure in the latter separating the interior of said hollow member from the interior of said sample receiving chamber of said fluid analyser;
  (f) an elongated hollow needle having a length greater than the distance from the exterior of the self-sealing puncturable closure of said second port to that face of the self-sealing puncturable closure of said first port which is remote from the interior of said hollow member, said needle being adapted to pass from the outside of said hollow member sequentially through: (i) the self-sealing puncturable closure of said second port, (ii) the walls of said puncturable container of fluid to be sampled and (iii) the self-sealing puncturable closure of said first port into the sample receiving chamber of said fluid analyser; and
  (g) means for drawing the fluid sample into said elongated hollow needle and for expelling said fluid sample from said elongated hollow needle into the sample receiving chamber of said fluid analyser.
5. The sampling device of claim 4 wherein said hollow member is provided with a detachable section to permit insertion of the puncturable fluid container into said hollow member.
6. The sampling device of claim 4 wherein said second port is provided with guide means adapted to permit passage of said elongated hollow needle therethrough and to orient said needle on the appropriate path necessary to achieve passage of said needle through the walls of said puncturable container and the self-sealing puncturable closure of said first port into the sample receiving chamber of said fluid analyser.
7. The sampling device of claim 4 wherein the fluid to be sampled is the gas enclosed in the cells of a plastic foam.
8. The sampling device of claim 7 wherein the external cross sectional diameter of the hollow needle is less than the average diameter of the cells of said plastic foam.
9. In a fluid sampling device the combination of:
  (a) a hollow member adapted to receive the fluid to be sampled;
  (b) a first and a second port disposed in opposite walls of said hollow member;
  (c) self-sealing puncturable closures sealing each of said first and second ports;
  (d) means for removing and replacing the gas in said hollow member;

(e) means for connecting said hollow member to the sample receiving chamber of a fluid analyser via said sealed first port;

(f) an elongated hollow needle adapted to pass from the outside of said hollow member sequentially through: (i) the self-sealing puncturable closure of said second port, (ii) the interior of said hollow member and, (iii) the self-sealing puncturable closure of said first port into the sample receiving chamber of said fluid analyser; and (g) means for drawing the fluid sample into said elongated hollow needle and for expelling said fluid from said elongated hollow needle into the sample receiving chamber of said fluid analyser.

10. The fluid sampling device of claim 9 wherein a self-sealing puncturable barrier separates the hollow member into two compartments one of which has the first port disposed therein and the other has the second port disposed therein each of said compartments being provided with means for evacuating and introducing fluid to be sampled therein, whereby the fluids in each compartment can be sampled successively by passage of said hollow needle therethrough.

References Cited

UNITED STATES PATENTS

| | | | |
|---|---|---|---|
| 2,971,369 | 2/1961 | Danaczko et al. | 73—421.5 |
| 3,148,544 | 9/1964 | Brown et al. | 73—421.5 |

LOUIS R. PRICE, *Primary Examiner.*

S. CLEMENT SWISHER, *Assistant Examiner.*